United States Patent [19]

Bondioli

[11] Patent Number: 5,173,082
[45] Date of Patent: Dec. 22, 1992

[54] TELESCOPIC PROTECTIVE CASING FOR A TRANSMISSION SHAFT WITH LUBRICATION DISTRIBUTION SYSTEM

[76] Inventor: Edi Bondioli, Via Gina Bianchi n.18, Suzzara, Mantova, Italy

[21] Appl. No.: 718,341

[22] Filed: Jun. 19, 1991

[30] Foreign Application Priority Data

Jun. 22, 1990 [IT] Italy ............................ 9433 A/90

[51] Int. Cl.⁵ ............................................. F16C 1/24
[52] U.S. Cl. .................................... 464/7; 184/105.3; 464/172
[58] Field of Search .................. 464/7, 11, 16, 170, 464/172, 162, 117, 118, 905; 403/23, 109, 359; 184/105.3

[56] References Cited

U.S. PATENT DOCUMENTS

| | | | |
|---|---|---|---|
| 1,612,322 | 12/1926 | Spicer | 464/170 X |
| 1,645,247 | 10/1927 | Loock | 464/7 |
| 3,080,731 | 3/1963 | Atkinson | 464/172 |
| 3,884,536 | 5/1975 | Buthe | 464/170 X |
| 4,435,166 | 3/1984 | Bondioli | 464/901 X |
| 4,747,804 | 5/1988 | Benzi | 464/170 |

FOREIGN PATENT DOCUMENTS 780930 8/1957 United Kingdom ................ 464/172

*Primary Examiner*—Daniel P. Stodola
*Assistant Examiner*—Tony A. Gayoso
*Attorney, Agent, or Firm*—McGlew and Tuttle

[57] ABSTRACT

The protective casing includes a system of telescopic tubes (26 and 27) that cover a pair of telescopic tubular elements (13 and 14) connecting two universal joints (9 and 11) on a transmission shaft. The inner telescopic tube (26) is fitted with a grease nipple (35) that is connected via a tube (39) to a chamber formed by a bushing (41) and a sealing ring (63). A suitable lubricant can be injected into the chamber, from the exterior, via the grease nipple (35), so that the telescopic tubular elements (13 and 14) can be kept lubricated without this requiring the transmission being uncoupled.

9 Claims, 4 Drawing Sheets

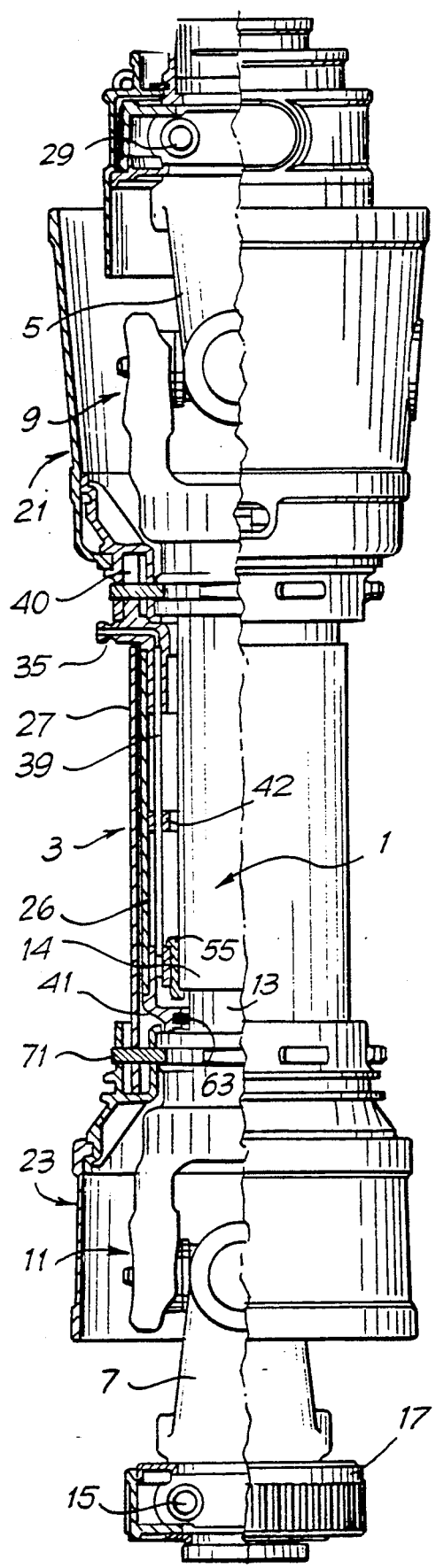
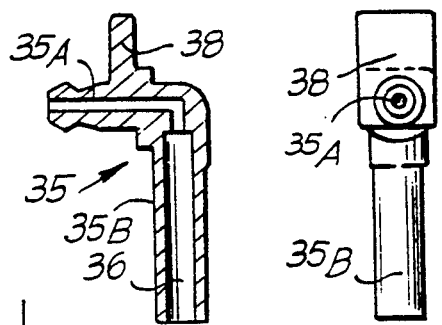
Fig. 1
Fig. 1A   Fig. 1B

TELESCOPIC PROTECTIVE CASING FOR A TRANSMISSION SHAFT WITH LUBRICATION DISTRIBUTION SYSTEM

FIELD OF THE INVENTION

The present invention refers to a protective casing for a transmission shaft with universal joints of the type that includes a system of telescopic tubes that cover two telescopic tubular elements that connect the first and second universal joints on the aforementioned transmission shaft.

BACKGROUND OF THE INVENTION

Protective casings of this type ar already known in the art, U.S. Pat. No. 4,435,166 discloses a protective casing. This protective casing also has two elements or cowlings that cover the joints on the shaft, which are connected by the system of telescopic tubes. Thus this type of protective casing, and other similar types, cover the entire transmission shaft formed by two universal joints and two tubular elements that form a telescopic connection. In order to ensure the transmission shaft functions well and is not subject to excessive wear, the tubular elements require lubricating from time to time. This task requires uncoupling the transmission shaft and removing the two tubular elements so that lubricant can be applied. This amounts to a time consuming and difficult task, which is often carried out less frequently than is necessary to lubricate the shaft well thus ensuring it operates correctly and is not subject to excessive wear.

SUMMARY AND OBJECTS OF THE INVENTION

The object of the present invention is to provide a protective wear casing of the type described above, that does not have these drawbacks and which, in particular, allows the transmission shaft to be lubricated without complex operations that involve uncoupling the transmission shaft.

According to the invention, a protective casing of the above mentioned type is characterized in that means for lubricating, from the exterior, the two telescopic tubular elements that connect the two universal joints, are attached to one of the two telescopic tubes of the protective casing. These means make it possible to place a lubricant (generally grease) in the interior of the protective casing on to the tubular elements that connect the two universal joints, without the transmission having to be directly reached requiring uncoupling or the inner parts. This reduces the number of operations necessary for lubrication, and also makes it possible to carry out lubrication more frequently, and therefore makes it possible to maintain the transmission shaft better.

In practice, the means of lubrication are connected to the inner telescopic tube, and include devices that make it possible to lubricate the exact area where the two telescopic elements slide on each other. This can be obtained by, for example, placing a grease nipple on the inner tube of the protective casing in a position where the two telescopic tubes are not superimposed. There is a rigid tube one end of which is connected to the grease nipple and the other end of which opens into a chamber placed in correspondence with the end of the outer telescopic tubular element. The lubricant travels down the tube into the chamber, and is then distributed onto the moving parts of the tubular telescopic elements. It is an advantage to shape the grease nipple so that it can be attached in a stable fashion to the protective casing, without the aid of any other means designed to hold it in position.

The invention also concerns a transmission shaft that includes two universal joints connected together by telescopically lengthening tubular elements and fitted with a protective casing of the above defined type.

BRIEF DESCRIPTION OF THE DRAWINGS

The invention is better explained by the following description and attached drawings, which show a practical and not limiting example of the invention, in which:

FIG. 1 is a side elevation and part lengthwise cross-section of a transmission shaft fitted with a protective casing according to the invention;

FIG. 1A is a lengthwise cross-section detail of the grease nipple;

FIG. 1B is a view from B—B in FIG. 1A;

DETAILED DESCRIPTION OF THE PREFERRED EMBODIMENTS

Figure 2:
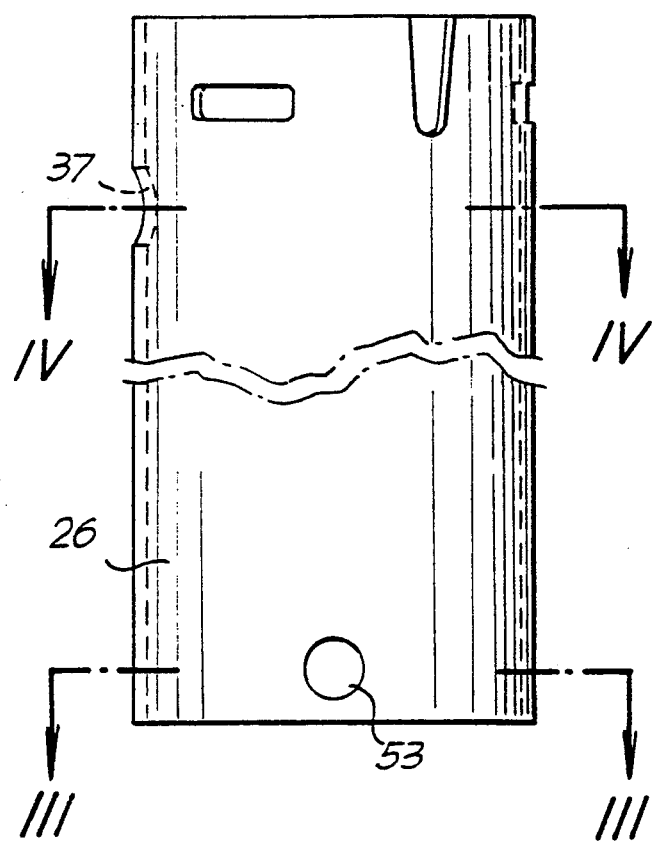
FIG. 2 is a side elevation of one of the telescopic tubes of the protective casing in FIG. 1.

FIG. 1 shows a transmission shaft (1) with a protective casing, indicated in its entirety by 3. The transmission shaft (1) connects two grooved shafts (not shown) that are inserted in grooved apertures in two yokes (5 and 7) of two universal joints (indicated in their entireties by 9 and 11) connected to each other by a central telescopically lengthening section formed by two tubular elements (13 and 14) that are coupled via a coupling which is obtained by the particular geometry of the two elements (13 and 14). The transmission shaft (1) is connected to the driven shaft by means of a locking pin (15) held by the yoke (7) and fitted to a rotating sleeve (17), of the type described in Patent EP-B-0 201 264, for example. The pin (17) connects the driven shaft to the universal joint (11) in such a way that it can be removed. The universal joints (9 and 11) are protected by cowlings (indicated in their entireties by 21 and 23, respectively) connected together by two telescopic tubes (26 and 27).

Similarly to that provided for the connection between the shaft and the yoke (7), there is a locking pin (29) between the drive link and the yoke (5) of the universal joint (9), which is held by the yoke (5) itself. The locking pin (29) is covered by a protective casing (indicated in its entirety by 33) that allows the pin to be operated.

Figure 4:
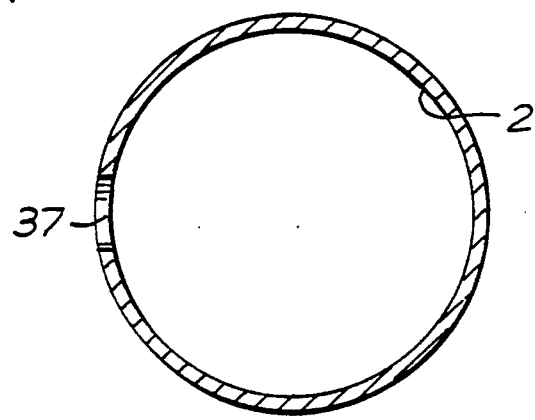
FIGS. 3 and 4 are transverse cross-sections from III—III and from IV—IV in FIG. 2.
Figure 3:
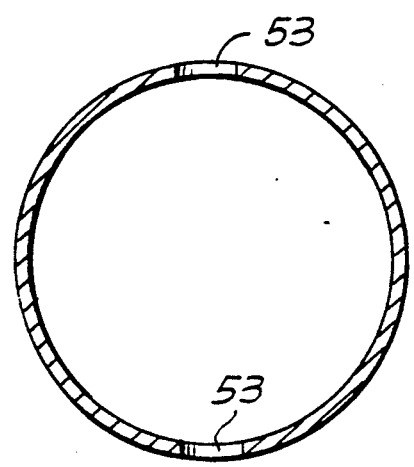
Figure 6:
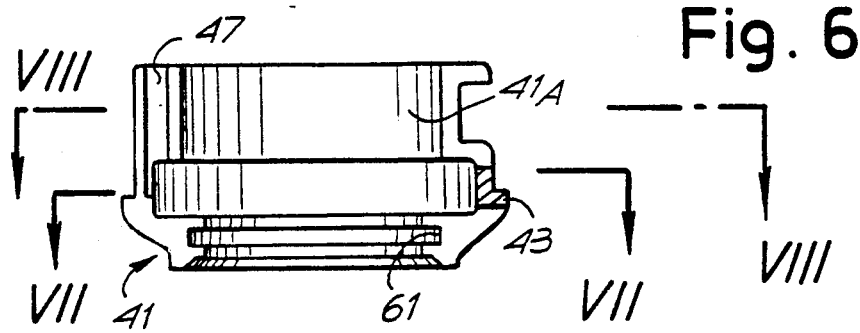
FIG. 6 is a cross-section from VI—VI in FIG. 7 of the bushing shown in FIG. 5.
Figure 7:
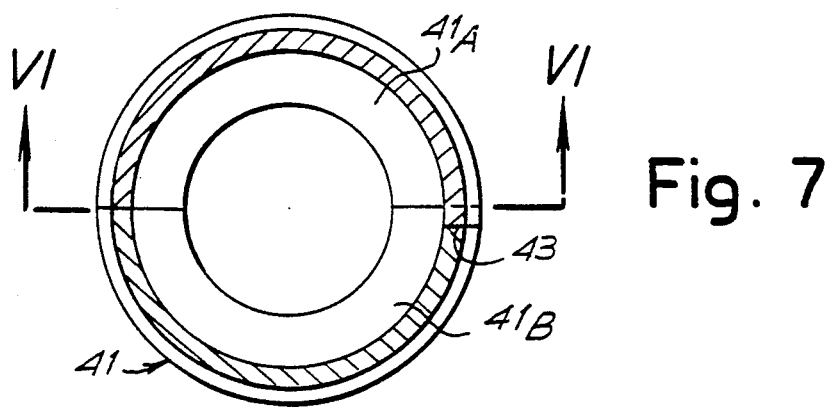
FIGS. 7 and 8 are transverse cross-sections from VII—VII and from VIII—VIII in FIG. 6.
Figure 8:
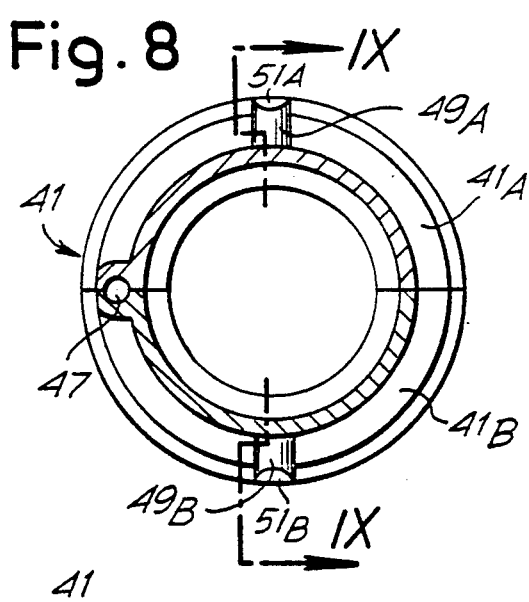
Figure 9:
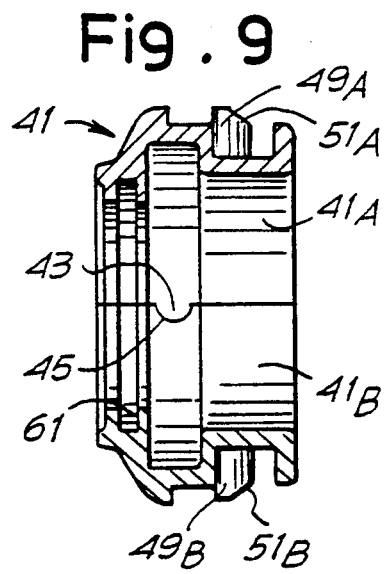
FIG. 9 is an axial cross-section from IX—IX in FIG. 8.
Figure 5:
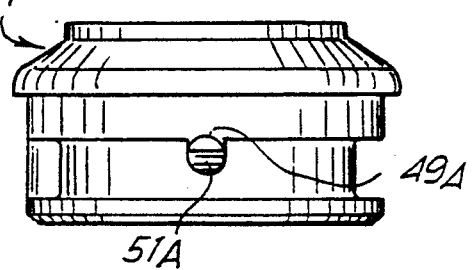
FIG. 5 is a side elevation of an end bushing of the means of lubrication.

The protective casing formed by the cowlings (21 and 23) and the telescopic tubes (26 and 27) is fitted, according to the invention, with means that allow the tubular elements (13 and 14) to be lubricated from the outside without dismantling the protective casing. To this end, the inner tube (26) is fitted with a grease nipple (35) housed in an aperture (37) (see FIGS. 2 and 4) close to the end of the inner tube to which the corresponding yoke of the universal joint (9) is applied.

As shown in the details in FIGS. 1A and 1B, the grease nipple has a body shaped at 90°, with a section (35A) that sticks out from the exterior of the inner telescopic tube (26), and a section (35B) designed to be housed inside the protective casing. This section (35B) is fitted with a seat (36) in which one end of a rigid tube (39) is inserted, for reasons that are later explained. There is an aperture in this seat (36) through which the lubricant passes. To the section (35A) of the grease nipple there is fixed a tongue (38) which, when the grease nipple (35) is mounted on the telescopic tube (26), is inserted into a seat (40) (see FIG. 1) in the protective casing (21). The thus shaped grease nipple can be snapped into place in the protective casing without requiring any further means to attach it, and takes up a position that is sufficiently stable to allow grease to be applied using a grease gun (of a known type).

The grease nipple (35) is connected to an end bushing (41), shown in detail in FIGS. 5 to 9, via the rigid tube (39). Between the grease nipple (35) and the end bushing (41), there is, in the example illustrated, a ring (42) attached to the internal cylindrical surface of the inner tube (26) by drive fit welding, or other suitable means. The aforementioned ring (42) has an aperture through which the tube (39) passes. The tube (39) is thus held in position even when the transmission shaft is of a considerable length. In addition, the ring (42) limits the degree of bending of the protective casing, in as much as when the inner tube (26) bends, the ring (42) moves until it rests against the external surface of the tubular element (14) and thus limits the degree of bending of the tubes (26 and 27) of the protective casing (3).

Figure 10:
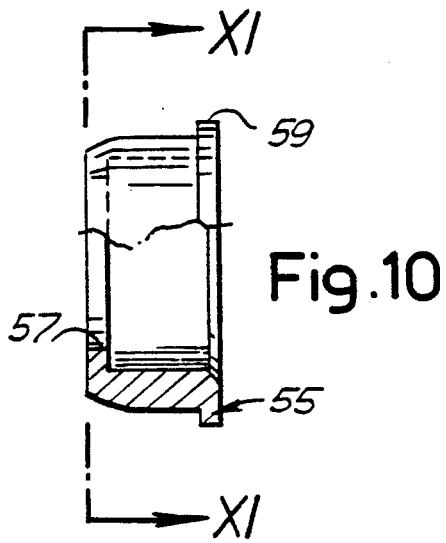
FIG. 10 is an axial cross-section of a support bushing.
Figure 11:
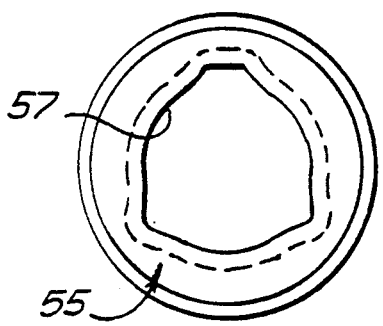
FIG. 11 is a view from XI—XI in FIG. 10.
Figure 12:
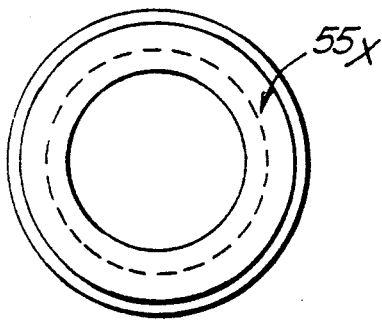
FIGS. 12 and 13 are similar views to that shown in FIG. 11, with different forms of construction.
Figure 13:
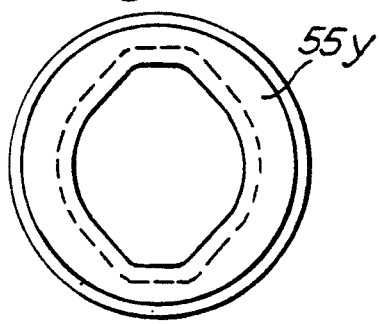

The end bushing (41) is constructed in two almost symmetrical sections (41A and 41B) connected together via a tongue (43) fixed to the section (41A), which is inserted in a corresponding cavity (45) in the other section (41B). When assembled together, the two sections (41A and 41B) form a seat (47) (See FIG. 6) into which the end of the tube (39), opposite to that connected to the grease nipple (35), is inserted and held. On each of the two sections (41A and 41B) forming the bushing (41) there is a pin (49A and 49B, respectively) shaped with a beveled end (51A and 51B, respectively). When the protective casing is assembled, the pins (49A and 49B) are inserted into corresponding diametrically opposed apertures (53) in the tube (26) (see FIG. 2). The bevels (51A and 51B) make it easier to insert and snap the pins (49A and 49B) into place in their respective apertures (53) thus preventing the bushing (41) from disconnecting itself from the tube (26). The bushing (41) rests on a support (55) that fits around the external tubular element (14) of the transmission shaft (1), and has two flanges (57 and 59) (see FIG. 10), the first of which forms a rabbet resting against the tubular element (14), and the second forms a rabbet for the bushing (41). The shape of the support (55) depends on the transverse cross-section of the tubular elements (13 and 14) that form the telescopic connection between the universal joints (9 and 11). As a matter of fact, the coupling between the two aforementioned tubular elements can be obtained using a splined connection, but it can also be achieved using differently shaped sections. The flange (57) on the support (55) is of a shape that corresponds to the cross-section of the tubular element (14) to which it is fitted, and in particular, to the cross-section of the axial aperture into which the other tubular element (13) is inserted. In FIGS. 11, 12, and 13, three different shapes for this support are shown (55, 55X, and 55Y, respectively), the second of which (55X) is used when a splined connection is used to couple the two tubular elements (13 and 14), whereas the remaining two (55 and 55Y) are used on tubular elements (13 and 14) with correspondingly shaped transverse cross-sections.

The support (55) also forms a further support point for the protective casing formed by the telescopic tubes (26 and 27), which are thus supported on the internal shaft in correspondence of the two inner yokes of the two universal joints (9 and 11), and in correspondence of an intermediate point in proximity to the end area of the outer telescopic tubular element (14).

Figure 14:
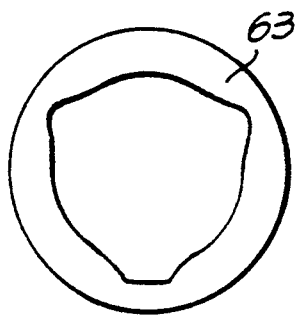
FIGS. 14 to 16 are front elevations of a holding ring in different forms of construction.
Figure 15:
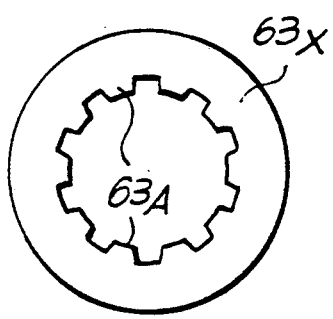
Figure 16:
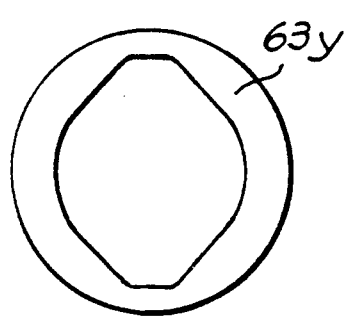

The end bushing (41) also has a ring-shaped groove (61) that houses a sealing ring (63), that seals it to the inner tubular element (13). The shape of the sealing ring (63) depends on the external shape of the inner tubular element (13) on which it must slide. In FIGS. 14, 15 and 16, three different shapes in which the sealing ring can be constructed are shown (63, 63X, and 63Y, respectively), to be used with various shapes of tubular elements (13 and 14). In particular, the shapes of the ring (63, 63X, and 63Y) are used in combination with those of the support (55, 55X, and 55Y, respectively).

It can be seen from the description that the same protective casing can be used on transmission shafts with differently shaped tubular elements (13 and 14). The only parts that are selected on the basis of the shape of the tubular elements (13 and 14) are the support (55) and the sealing ring (63).

The bushing (41), support (55), and sealing ring (63) form an annular chamber into which grease is inserted via the grease nipple (35) and the tube (39). The aforementioned grease is heated by friction between the tubular elements (13 and 14), and is distributed by the reciprocating relative movement of the tubular elements (13 and 14); the sealing ring (63) prevents grease or oil from leaking from the area where the tubular elements (13 and 14) slide. The sealing ring could also not seal perfectly and the resulting leak could be adjusted so that it gradually supplies a predetermined quantity of lubricant into a groove (71) on the inner yoke of the universal joint (11), in which the support elements of the protective casing (3) slide. To this end, the surface of the sealing ring that comes into contact with the surface of the tubular element (13) could have small protuberances or flanges placed symmetrically along the tangential length of its surface in such a way as to center the sealing ring (63) on the relative tubular element (13) without it adhering over the entire surface, so that a slight predetermined quantity of lubricant leaks out. In the case of the second type of sealing ring (63X), this controlled leakage can easily be obtained by suitably sizing the internal protuberances (63A), so that they are slightly smaller than the corresponding grooves in the tubular element (13).

It is understood that the drawings only show one example of the invention as a practical demonstration, as the shapes and design can vary without, however, being beyond the scope of the concept on which the invention is based. The reference numbers in the Claims have the sole purpose of making the reference of the claims to the attached drawings easier, and do not limit the scope of the protection represented by the claims themselves.

I claim:

1. A protective casing for a transmission shaft, comprising:
   a telescopic transmission shaft including an internal telescopic transmission shaft element with a free end and a joint end and an external telescopic transmission shaft element with a free end and a joint end, said internal telescopic transmission shaft element being connected to a first universal joint at said internal telescopic transmission shaft joint end and said external telescopic transmission shaft element being connected to a second universal joint at said external telescopic transmission shaft joint end;
   said protective casing including an outer protective telescopic tube and an inner protective telescopic tube, said outer protective telescopic tube and said inner protective telescopic tube cooperating to cover said internal and external telescopic transmission shaft elements;
   a grease nipple connected to said inner protective telescopic tube of said protective casing;
   means defining a chamber surrounding said free end of said external telescopic transmission shaft element for holding lubricant at said free end of said external telescopic transmission shaft element;
   connection means for connecting said grease nipples and said means defining a chamber for supplying lubricant between said internal and external telescopic elements, said connection means comprises a lubrication tube, and said grease nipple has two sections that are respectively at an angle, one of said sections projecting from the exterior of said protective casing, and the other of said sections being inside the protective casing and having a seat into which said tube fits.

2. A protective casing as in claim 1 wherein said means defining a chamber is formed by a bushing, which includes connector means for connecting said bushing to one of said telescopic tubular elements of said protective casing, said bushing including an annular groove housing a sealing ring, said sealing ring making contact with one of said protective telescopic tubular elements.

3. A protective casing as in claim 2, wherein the said bushing is mounted on one of said two telescoping tubular elements by means of a protective casing support, said protective casing support forming a support for said protective casing.

4. A protective casing as in claim 3, wherein said sealing ring includes leakage means for allowing lubricant to leak towards said protective casing support.

5. A protective casing as in claim 4, wherein the sealing ring has one or more protuberances on its surface that make contact with said one of said protective telescopic tubular elements on which it is fitted.

6. A protective casing as in claim 1, wherein said grease nipple has a tongue designed to be inserted in a corresponding seat in the protective casing.

7. A protective casing as in claim 1, further comprising a ring fixed to said inner protective telescopic tube, said ring being attached between said grease nipple and said means defining a chamber, said ring having an aperture through which said connection means passes.

8. A protective casing as in claim 1, further comprising a first covering element connected to said transmission shaft, covering said first universal joint and a second covering element connected to said transmission shaft, covering said second universal joint.

9. A protective casing for a transmission shaft, comprising: a telescopic transmission shaft including an internal telescopic transmission shaft element with a free end and a joint end and an external telescopic transmission shaft element with a free end and a joint end, said internal telescopic transmission shaft element being connected to a first universal joint at said internal telescopic transmission shaft joint end and said external telescopic transmission shaft element being connected to a second universal joint at said external telescopic transmission shaft joint end,
   a first covering element connected to said transmission shaft covering said first universal joint;
   said protective casing including an outer protective telescopic tube and an inner protective telescopic tube, said outer protective telescopic tube and said inner protective telescopic tube cooperating to cover said internal and external telescopic transmission shaft elements;
   a grease nipple connected to said inner protective telescopic tube of said protective casing and extending outwardly of said outer protective tube between a free end of said outer protective telescopic tube and said first covering element;
   means defining a chamber surrounding said free end of said external telescopic transmission shaft element for holding lubricant at said free end of said external telescopic transmission shaft element;
   connection means including a lubrication tube for connecting said grease nipple and said means defining a chamber for supplying lubricant between said internal and external telescopic transmission shaft elements.

* * * * *